H. R. BURDGE.
Sulky-Cultivator.
No. 224,139. Patented Feb. 3, 1880.
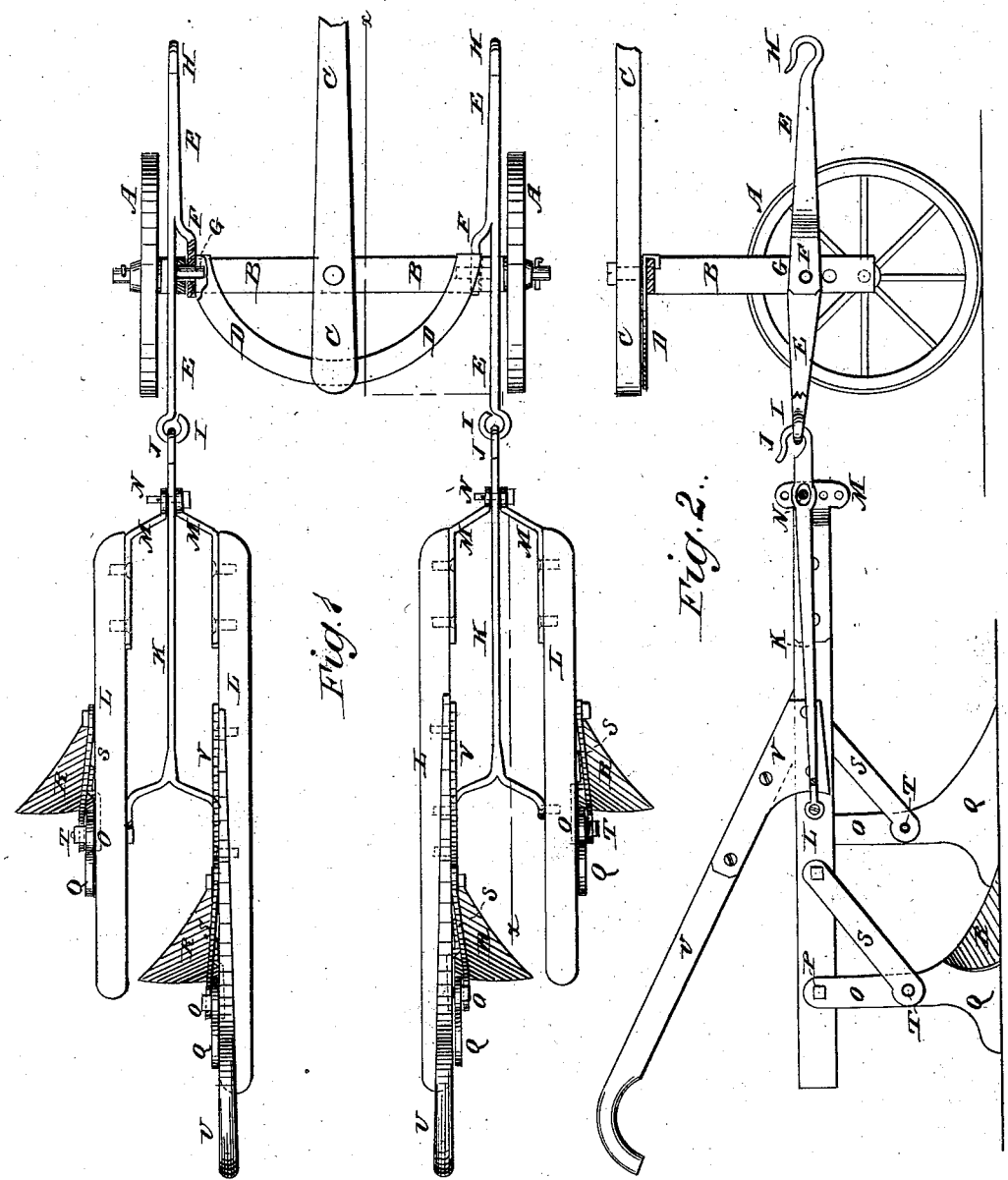

UNITED STATES PATENT OFFICE.

HENRY R. BURDGE, OF CAPE GIRARDEAU, MISSOURI, ASSIGNOR TO HIMSELF AND CHARLES FEURTH, OF SAME PLACE.

SULKY-CULTIVATOR.

SPECIFICATION forming part of Letters Patent No. 224,139, dated February 3, 1880.

Application filed November 22, 1879.

*To all whom it may concern:*

Be it known that I, HENRY R. BURDGE, of Cape Girardeau, in the county of Cape Girardeau and State of Missouri, have invented a new and useful Improvement in Sulky-Cultivators, of which the following is a specification.

Figure 1 is a plan view of my improved cultivator. Fig. 2 is a sectional side elevation taken through the broken line $xx$, Fig. 1. Fig. 3 is a plan view of one of the plows. Fig. 4 is a side elevation of one of the plows.

The object of this invention is to furnish sulky-cultivators so constructed as to loosen and mellow the soil and cut off the roots of grass and weeds without turning the soil over, and which may be readily adjusted to work deeper or shallower in the ground, and will work at a uniform depth in uneven ground.

The invention consists in the combination, with the plows, of devices for applying the draft to the plow-beams and for connecting the plows with the sulky, as will be hereinafter fully described.

Similar letters of reference indicate corresponding parts.

A are the wheels, B is the arched axle, and C is the tongue, of the sulky. The tongue C is attached, at a little distance from its rear end, to the center of the axle B. The connection between the tongue C and the axle B is strengthened by the semicircular brace-bar D, the center of which is attached to the rear end of the tongue C, and its ends are attached to the axle B.

E are the draft-bars, upon the inner sides of which, a little in the rear of their centers, are formed half-keepers F, to receive the upright parts of the axle B. The bars E are pivoted to the axle B by pins or bolts G, which pass through the draft-bars E, the axle B, and the half-keepers F, as shown in Figs. 1 and 2. Upon the forward ends of the draft-bars E are forked hooks H, to receive the single-tree staples, and upon the rear ends of the said bars E are formed eyes I, to receive the hooks J, formed upon the forward ends of the draw-bars K of the cultivators. The draft-bars E thus connect the sulky with the plows in such a way that the plows will work at a uniform depth even when the ground is uneven, the said bars adjusting themselves upon their pivots as the direction of the line of draft may require.

The rear ends of the draw-bars K are forked, and the ends of their prongs or branches are bolted to the plow-beams L, so that the draft may be applied near the plows. To the forward ends of the beams L are attached metal straps M, which have cross-heads formed upon their forward ends, and are bent inward and forward so that their cross-heads may rest against the opposite sides of the draw-bars K.

In the cross-heads of the straps M are formed a number of holes to receive the bolts N, by which they are connected with the draw-bars K, so that the beams L may be adjusted to cause the plows to work deeper or shallower in the ground, as may be required.

The draw-bars K have elongated or oval holes formed through them to receive the bolts N, so that none of the draft-strain will come upon the bolts N.

To the beams L are pivoted the upper ends of the plow-standards O by bolts P. Upon the lower ends of the standards O are formed, or to them are attached, the land-sides Q of the plows, which land-sides are made long. Upon the land-sides Q are formed, or to them are attached, the shares R, which are made wide, low, and much shorter than the land-sides Q. With this construction, as the plows are drawn forward the shares R will cut off the roots of the grass and weeds without turning a furrow, so that the weeds will be killed by the sun, and the surface of the ground will be left smooth and level, and will not be liable to be washed into gullies by rain, while the soil beneath the surface will be left loose and mellow.

The draft-strain upon the plows Q R is sustained by the braces S, the forward ends of which are bolted to the beams L. The rear ends of the braces S are forked to receive the standards O, and are secured to the said standards O by wooden pins T, which are made of sufficient strength to sustain the draft-strain under ordinary circumstances, but which, should the plows strike a root or other obstruction, will break and allow the plows to swing back without being broken. To the beams L are attached the handles U, by which the cultivators are guided, and which are strengthened in position by metal plates V, attached to them and to the beams L.

Having thus fully described my invention, I claim as new and desire to secure by Letters Patent—

1. The combination, with the axle B and half-keepers F, of the bars E, pivoted to the axle and adapted to connect with the singletrees and the draw-bars of the plows, as shown and described.

2. The branched draft-bar K, pivoted to the beams above the plow and connected by a slot with the clevis-pin N, in combination with the cultivator-beams L and the clevis-plate M, as and for the purpose specified.

3. In a cultivator, the combination, with the draw-bars K of the plow-beams and the axle B of the sulky, of the pivoted draft-bars E, substantially as herein shown and described, to keep the plows at a uniform depth when working upon uneven ground, as set forth.

H. R. BURDGE.

Witnesses:
T. F. WHEELER,
SAM. M. GREEN.